Nov. 7, 1967 I. IMAHASHI 3,351,822
TRANSISTOR CIRCUIT FOR GENERATING PULSES IN ALTERNATE DIRECTIONS
Filed April 29, 1965

INVENTOR.
ISSEI IMAHASHI
BY Blum, Moscovitz, Friedman
Blum & Kaplan
ATTORNEYS

United States Patent Office 3,351,822

Patented Nov. 7, 1967

3,351,822

TRANSISTOR CIRCUIT FOR GENERATING PULSES IN ALTERNATE DIRECTIONS

Issei Imahashi, Nagano-ken, Japan, assignor to Kabushiki Kaisha Suwa Seikosha

Filed Apr. 29, 1965, Ser. No. 451,829
Claims priority, application Japan, Oct. 28, 1964, 39/61,002
10 Claims. (Cl. 317—148.5)

This invention relates to transistor control circuits and more particularly to a transistor circuit for generating pulses in alternate directions through a coil.

It has been known to operate and drive a coil by providing current flow in the form of pulses through the coil in one direction and then in the opposite direction. This operation of coils has been used extensively for control purposes in which an output device is controlled. The output device is responsive to a current in one direction to accomplish one control function and is responsive to a current in the opposite direction to accomplish another control function. However, in prior circuits the current flow has been controlled by mechanical means such as relays which have left something to be desired in speed and reliability of operation.

Accordingly, an object of the present invention is providing a coil with current flow in alternate directions in the form of pulses by means of transistor circuitry.

Another object is power amplification between the input to the transistor circuit and the output drive to the coil.

In accordance with the present invention there is provided a transiently operated transistor control circuit having a first and second pair of transistors. The collectors of the first transistors of the first and second pairs are connected together at a first junction. The collectors of the second transistors of the first and second pairs are connected together at a second junction. The first pair of transistors is maintained normally cut-off. The second pair of transistors is cross connected in which a first impedance cross connects the base of the second transistor to the first junction and a second impedance cross connects the base of the second transistor to the second junction. In this manner, with the first transistor pair maintained cutoff the second transistor pair is also maintained normally cut-off. In addition, a control coil is connected between the first and second junctions. In operation, input pulses are alternately applied to the first and second transistors of the first pair. When an input pulse is applied to the first transistor it is turned on thereby to turn on the second transistor of the second pair to provide current flow through the coil in a first direction. When an input pulse is applied to the second transistor it is turned on thereby to turn on the first transistor of the second pair to provide current flow through the coil in a second direction. In this manner, with input pulses applied alternately to the first and second transistors of the first pair, the current flows first in one direction and then in an opposite direction through the control coil.

Figure 1:
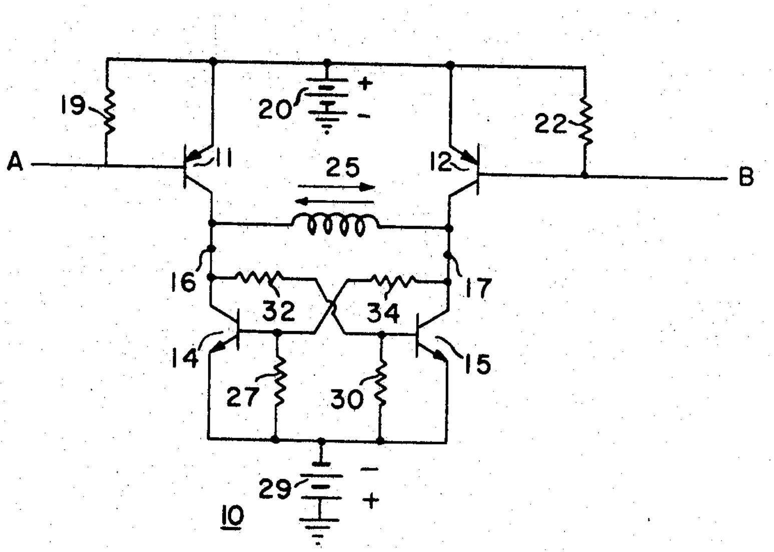
Figure 2:
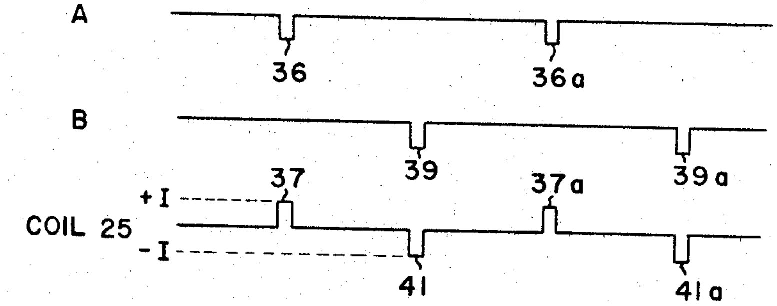

For further objects and advantages of the invention and for a typical embodiment thereof, reference is to be had to the following description taken in conjunction with the accompanying drawings, in which:

FIG. 1 schematically illustrates a transistor control circuit embodying the invention; and FIG. 2 illustrates waveforms helpful in explaining the operation of the circuit of FIG. 1.

Referring now to FIG. 1, the transistor control circuit 10 includes a first pair of transistors 11 and 12 illustrated as of the PNP type and a second pair of transistors 14 and 15 illustrated as of the NPN type. A first transistor 11 of the first pair has its collector connected to the collector of a first transistor 14 of the second pair at a junction 16. In similar manner a second transistor 12 of the first pair has its collector connected to a collector of a second transistor 15 of the second pair at a junction 17. An input signal terminal A is connected to the base of first transistor 11 and an input signal terminal B is connected to the base of second transistor 12.

With no input signals applied to terminal A, first transistor 11 is maintained cut-off or non-conductive as a result of a substantially small value resistor 19 connected between the base and emitter of PNP transistor 11 and with the emitter thereof connected to the positive side of a supply battery 20. In similar manner second transistor 12 is maintained cut-off with no input signals applied to input terminal B as a result of a small value resistor 22 connected between the base and emitter of that PNP transistor and with the emitter thereof connected to the positive side of battery 20, the negative side of which is connected to the ground. With transistors 11 and 12 maintained cut-off, no current flows through junctions 16 and 17 and these junctions are maintained at substantially the negative potential of a supply battery 29.

Junction 16 is maintained at that negative potential as a result of a circuit which may be traced by way of the negative side of battery 29, a resistor 30, the base of transistor 15, a cross-connected resistor 32 to junction 16. Junction 17 is also maintained at that negative potential by way of a circuit traced from the negative side of battery 29, a resistor 27, the base of transistor 14, a cross-connected resistor 34 to junction 17. It will now be understood that with transistors 11 and 12 maintained cut-off, transistors 14 and 15 of the second pair are also maintained cut-off. NPN transistor 14 is maintained cut-off since resistor 27 is connected between its base and emitter and its emitter is connected to the negative side of battery 29. NPN transistor 15 is maintained cut-off since resistor 30 is connected between its base and emitter and its emitter is connected to the negative side of battery 29.

With the first pair of transistors 11 and 12 cut-off as well as the second pair of transistors 14 and 15, it will be seen that there is no current flow through a coil 25 connected between junctions 16 and 17. Coil 25 is utilized for the controlled applications of the present invention and it will now be understood that with no input pulse applied to either terminal A or B that there is no current flow through that coil 25.

When a negative voltage input pulse 36 is applied to input terminal A, as shown in FIG. 2, transistor 11 is turned on and the potential at junction 16 increases immediately to substantially the positive potential of battery 20. Accordingly, current flow may be traced by way of battery 20, the emitter, base and collector of transistor 11, junction 16, cross-connecting resistor 32, resistor 30 to the negative side of battery 29. In this manner the base of transistor 15 has a positive-going potential applied thereto thereby to turn on that transistor. On the other hand transistor 14 is maintained non-conductive or cut-off since the potential at its base does not change as a result of transistor 12 being maintained cut-off.

With transistors 11 and 15 turned on it will be seen that current flow through coil 25 may be traced in the direction of the solid line arrow by way of the positive side of battery 20, transistor 11, coil 25, junction 17, transistor 15 and to battery 29. This current, as shown by pulse 37, FIG. 2, flows through coil 25 during the time duration that transistor 11 is maintained turned on by reason of the negative voltage pulse 36 applied to terminal A. At the termination of that pulse, transistor 11 is rendered non-conductive or cut-off and the current flow through coil 25 terminates, as shown by current pulse 37, FIG. 2. With transistor 11 cut-off, the potential at junction 16 becomes positive-going and transistor 15 is also cut-off. Accordingly, transistor circuit 10 is returned to its normal state in which all four transistors 11, 12, 14 and 15 are cut-off.

The next input voltage pulse 39 is applied to input terminal B and is effective to turn on transistor 12 to produce a potential change at junction 17 which increases immediately to substantially the positive potential of battery 20. Accordingly, current flow may be traced by way of the positive side of battery 20, the emitter, base and collector of transistor 12, junction 17, cross-connecting resistor 34, resistor 27, and to the negative side of battery 29. In this manner there is a change of potential at the base of transistor 14 in a positive-going direction which is effective to turn on that transistor. On the other hand transistor 15 is maintained cut-off since the potential at its base does not change as a result of transistor 11 being maintained cut-off.

With transistor 14 turned on, current flow through coil 25 may be traced in the direction of the dotted line arrow and by way of the positive side of battery 20, transistor 12, coil 25, junction 16, transistor 14, and to battery 29. This current flow through coil 25, as shown by pulse 41, FIG. 2, is maintained until the termination of the pulse 39 applied to terminal B which renders transistor 12 non-conductive. At the time of termination of pulse 39, transistor 12 as well as transistor 14 is rendered non-conductive or cut-off, the current through coil 25 is terminated and circuit 10 returns to its normal state preparatory for a next pulse **36*a* applied to terminal A. In the manner previously decsribed pulse 36*a* applied to terminal A will produce a current pulse 37*a* through coil 25 and pulse 39*a* applied to terminal B will produce a current pulse 41*a* through coil 25**.

It will now be understood that with pulses applied alternately to input terminals A and B the current flowing through coils 25 alternates in direction. Coil 25 may be utilized as the coil of a latching relay (not shown) in which current flow in one direction latches the relay and when the coil 25 is deenergized the relay is held in its latched position. The relay is released only upon current flow in the opposite direction. It will also be understood that coil 25 may be used as the primary of a pulse transformer in which a secondary coil (not shown) is isolated from input terminals A and B.

The transistor control circuit of the present invention provides power amplification in which the output power applied to the coil 25 is substantially greater than the input power applied to input terminals A and B. More particularly the power applied to input terminals A and B may be of substantially small value while the power applied to drive the coil 25 in both directions may be of substantially large value for desired applications.

With the above understanding of the invention it will be understood that many further variations may be made. For example, transistors 11 and 12 may be of the NPN type while transistors 14 and 15 may be of the PNP type with corresponding reversal of the polarity of batteries 20 and 29. Further changes and modifications may be made all within the scope of the appended claims.

What is claimed is:

1. A system for providing current flow through a coil in alternate directions comprising, a first and a second pair of transistors with each transistor having at least a base, an emitter and a collector, the collector of a first transistor of said first pair being connected to the collector of a first transistor of said second pair at a first junction, the collector of said second transistor of said first pair being connected to the collector of a second transistor of said second pair at a second junction, input circuit means for normally maintaining non-conductive said first pair of transistors, means including impedance means cross-connecting said second pair of transistors and connected to said first and second junctions for maintaining non-conductive said second pair of transistors when said first pair of transistors is non-conductive, said coil being connected between said first and said second junctions, and means connected to said input circuit means for applying input pulses alternately to said first and second transistors of said first pair to (1) turn on said first transistor of said first pair thereby to turn on said second transistor of said second pair to provide current flow through said coil in a first direction and (2) to turn on said second transistor of said first pair thereby to turn on said first transistor of said second pair to provide current flow through said coil in a second direction.

2. The system of claim 1 in which said first pair of transistors is of one transistor type and said second pair is of an opposite type.

3. The system of claim 1 in which said first pair of transistors is of the PNP type and said second pair is of the NPN type.

4. The system of claim 1 in which said impedance means includes a first resistor connecting said base of said second transistor of said second pair to said first junction and a second resistor connecting said base of said first transistor of said second pair to said second junction.

5. The system of claim 4 in which there is provided supply means including a third resistor connected to said first resistor and a fourth resistor connected to said second resistor for maintaining non-conductive said second pair when said first pair is non-conductive.

6. A transiently operated transistor control circuit for providing current flow through a control coil in alternate directions in the form of pulses comprising, a first and a second pair of transistors with each transistor having at least a base, an emitter, and a collector, said collectors of first transistors of said first and second pairs being connected at a first junction, said collectors of second transistors of said first and second pairs being connected at a second junction, circuit means for normally maintaining cut-off said first pair of transistors, first impedance means cross-connecting said base of said second transistor of said first pair to said first junction and second impedance means cross-connecting said base of said first transistor of said second pair to said second junction, supply means connected to said first and second impedance means for maintaining cut-off said second pair of transistors when said first pair is cut-off, said control coil being connected between said first and second junctions, and input means for applying input pulses alternately to said first and second transistors of said first pair to (1) turn on said first transistor of said first pair thereby to turn on said second transistor of said second pair to provide current flow through said coil in a first direction by way of said turn on transistors only for the time duration of an input pulse applied to said first transistor and (2) to turn on said second transistor of said first pair thereby to turn on said first transistor of said second pair to provide current flow through said control coil in a second direction by way of said turn on transistors only during the time duration of an input pulse applied to said second transistor.

7. The control circuit of claim 6 in which said first pair of transistors is of one transistor type and said second pair is of an opposite type.

8. The control circuit of claim 6 in which said first pair of transistors is of the PNP type and said second pair is of the NPN type.

9. The control circuit of claim 6 in which said first impedance means comprises a resistor connecting said base of said second pair to said first junction and said second impedance means comprises a second resistor connecting said base of said first transistor of said second pair to said second junction.

10. The control circuit of claim 9 in which said supply means includes a third resistor connected to said first resistor and a fourth resistor connected to said second resistor for maintaining non-conductive said second pair when said first pair is non-conductive.

References Cited

UNITED STATES PATENTS

| | | | |
|---|---|---|---|
| 2,838,675 | 6/1958 | Wanlass | 317—123 |
| 2,900,215 | 8/1959 | Schoen | 346—74 |
| 3,022,454 | 2/1962 | Millis | 317—148.5 |
| 3,097,307 | 7/1963 | Bonn | 317—123 |

MILTON O. HIRSHFIELD, *Primary Examiner.*

L. T. HIX, *Assistant Examiner.*